US 9,531,873 B2

(12) United States Patent
Kurapati et al.

(10) Patent No.: US 9,531,873 B2
(45) Date of Patent: Dec. 27, 2016

(54) SYSTEM, METHOD AND APPARATUS FOR CLASSIFYING COMMUNICATIONS IN A COMMUNICATIONS SYSTEM

(75) Inventors: Srikrishna Kurapati, Richardson, TX (US); Nathaniel E. Ayewah, Dallas, TX (US)

(73) Assignee: Avaya Inc., Basking Ridge, NJ (US)

( * ) Notice: Subject to any disclaimer, the term of this patent is extended or adjusted under 35 U.S.C. 154(b) by 1683 days.

(21) Appl. No.: 11/521,427

(22) Filed: Sep. 14, 2006

(65) Prior Publication Data

US 2007/0076853 A1   Apr. 5, 2007

Related U.S. Application Data

(60) Provisional application No. 60/717,065, filed on Sep. 14, 2005.

(51) Int. Cl.
| | |
|---|---|
| *H04L 12/26* | (2006.01) |
| *G06F 17/30* | (2006.01) |
| *H04M 3/22* | (2006.01) |
| *H04L 29/06* | (2006.01) |
| *H04M 3/436* | (2006.01) |
| *H04M 7/00* | (2006.01) |
| *H04L 12/58* | (2006.01) |

(52) U.S. Cl.
CPC ........ *H04M 3/436* (2013.01); *H04L 29/06027* (2013.01); *H04L 63/1458* (2013.01); *H04L 65/1079* (2013.01); *H04M 7/0078* (2013.01); *H04L 12/585* (2013.01)

(58) Field of Classification Search
CPC ......... H04M 9/082; G10L 25/15; G10L 19/00; G10L 21/00
See application file for complete search history.

(56) References Cited

U.S. PATENT DOCUMENTS

| | | | |
|---|---|---|---|
| 5,497,371 A * | 3/1996 | Ellis et al. | ..................... 370/412 |
| 5,581,610 A | 12/1996 | Hooshiari | |
| 5,751,964 A | 5/1998 | Ordanic et al. | |
| 6,137,782 A | 10/2000 | Sharon et al. | |

(Continued)

OTHER PUBLICATIONS

Commercial Libraries, Data Compression—Speech, http://datacompression.info/Speech.shtml, accessed May 2005.

(Continued)

*Primary Examiner* — Parth Patel
*Assistant Examiner* — Jason Harley
(74) *Attorney, Agent, or Firm* — Sheridan Ross P.C.

(57) ABSTRACT

The present invention provides a system, method and apparatus for automatically classifying voice communications, such as voice messages and phone calls in prerecorded voicemails (one speaker) and two-way conversations, as either spam or legitimate signals in a communications system (e.g., SIP, IMS, UMA, etc.). More specifically, the present invention classifies a voice communication session by receiving one or more voice communication packets associated with the voice communication session, extracting one or more properties from the received voice communication packets and classifying the voice communication session based on the extracted properties. The present invention can also be implemented as a computer program embodied on a computer readable medium wherein each step is performed by one or more code segments.

53 Claims, 7 Drawing Sheets

(56) References Cited

U.S. PATENT DOCUMENTS

| | | | |
|---|---|---|---|
| 6,363,065 | B1 | 3/2002 | Thornton et al. |
| 6,498,791 | B2 | 12/2002 | Pickett et al. |
| 6,598,183 | B1 | 7/2003 | Grieco et al. |
| 6,633,835 | B1 | 10/2003 | Moran et al. |
| 6,665,293 | B2 | 12/2003 | Thornton et al. |
| 6,757,823 | B1 | 6/2004 | Rao et al. |
| 6,769,016 | B2 | 7/2004 | Rothwell et al. |
| 6,781,955 | B2 | 8/2004 | Leung |
| 6,791,955 | B1 | 9/2004 | Kikuchi et al. |
| 6,816,455 | B2 | 11/2004 | Goldberg et al. |
| 6,842,449 | B2 | 1/2005 | Hardjono |
| 7,046,680 | B1 | 5/2006 | McDysan et al. |
| 7,092,357 | B1 | 8/2006 | Ye |
| 7,107,061 | B1 | 9/2006 | Tontiruttananon et al. |
| 7,380,011 | B2 | 5/2008 | Li et al. |
| 7,383,574 | B2 | 6/2008 | Burrows et al. |
| 7,385,957 | B2 | 6/2008 | O'Neill |
| 7,508,767 | B2 | 3/2009 | Shinomiya |
| 7,681,101 | B2 | 3/2010 | Oran et al. |
| 7,720,462 | B2 | 5/2010 | Chu |
| 7,880,738 | B2 | 2/2011 | Kurapati et al. |
| 8,027,251 | B2 | 9/2011 | Ormazabal et al. |
| 8,341,724 | B1 | 12/2012 | Burns et al. |
| 8,364,807 | B1 | 1/2013 | Lewis |
| 8,464,329 | B2 | 6/2013 | Fogel |
| 8,477,605 | B2 | 7/2013 | Elliott et al. |
| 8,477,759 | B2 | 7/2013 | Dyck et al. |
| 2001/0042234 | A1* | 11/2001 | Sasaki et al. ............... 714/752 |
| 2002/0083175 | A1 | 6/2002 | Afek et al. |
| 2002/0099854 | A1* | 7/2002 | Jorgensen .................. 709/249 |
| 2002/0129236 | A1 | 9/2002 | Nuutinen |
| 2002/0165718 | A1* | 11/2002 | Graumann ............ G10L 25/78 704/270 |
| 2003/0009694 | A1* | 1/2003 | Wenocur et al. ............ 713/201 |
| 2003/0009699 | A1 | 1/2003 | Gupta et al. |
| 2003/0021296 | A1* | 1/2003 | Wee et al. .................. 370/474 |
| 2003/0067903 | A1* | 4/2003 | Jorgensen .................. 370/338 |
| 2003/0110286 | A1* | 6/2003 | Antal et al. ................. 709/236 |
| 2003/0125087 | A1 | 7/2003 | Shimizu |
| 2003/0131350 | A1* | 7/2003 | Peiffer et al. ............... 725/18 |
| 2004/0042470 | A1 | 3/2004 | Cooper et al. |
| 2004/0083299 | A1 | 4/2004 | Dietz et al. |
| 2004/0086093 | A1 | 5/2004 | Schranz |
| 2004/0161086 | A1 | 8/2004 | Buntin et al. |
| 2004/0203799 | A1* | 10/2004 | Siegel ....................... 455/445 |
| 2004/0260560 | A1 | 12/2004 | Holloway et al. |
| 2005/0053052 | A1* | 3/2005 | Ree et al. ................... 370/352 |
| 2005/0132060 | A1 | 6/2005 | Mo et al. |
| 2005/0201363 | A1 | 9/2005 | Gilchrist et al. |
| 2005/0232193 | A1* | 10/2005 | Jorgensen .................. 370/329 |
| 2005/0249214 | A1 | 11/2005 | Peng |
| 2005/0259667 | A1* | 11/2005 | Vinokurov et al. ......... 370/401 |
| 2006/0028980 | A1 | 2/2006 | Wright |
| 2006/0036727 | A1 | 2/2006 | Kurapati et al. |
| 2006/0140385 | A1* | 6/2006 | Haase et al. ............. 379/221.09 |
| 2006/0224750 | A1* | 10/2006 | Davies et al. ............... 709/229 |
| 2006/0288411 | A1 | 12/2006 | Garg et al. |
| 2007/0061145 | A1* | 3/2007 | Edgington et al. .......... 704/262 |
| 2007/0121596 | A1 | 5/2007 | Kurapati et al. |
| 2007/0150276 | A1 | 6/2007 | Srivastava et al. |
| 2007/0204060 | A1 | 8/2007 | Higuchi et al. |
| 2008/0016334 | A1 | 1/2008 | Kurapati et al. |
| 2008/0016515 | A1 | 1/2008 | Kurapati et al. |
| 2008/0229382 | A1 | 9/2008 | Vitalos |
| 2009/0094671 | A1 | 4/2009 | Kurapati et al. |
| 2009/0144820 | A1 | 6/2009 | Kurapati et al. |
| 2011/0173697 | A1 | 7/2011 | Kurapati et al. |

OTHER PUBLICATIONS

Data Compression Download Source Codes and Papers. http://www.data-compression.com/download.shtml, accessed May 2005.

Hidden Markov Model Toolkit, http://htk.eng.cam.ac.uk/.

http://www.bell-labs.com/project/tts/voices.html.

http://www.dli2.nsf.gov/.

http://www.ipodder.org/.

http://www.microsoft.com/reader/developers/downloads/tts.asp.

http://www.naturalvoices.att.com/.

ITU-T. Recommendation G.191, Software Tool Library 2000 User's Manual. ITU, Geneva, Dec. 2000.

ITU-T. Recommendation G.711, Pulse code molulation (PCM) of voice frequencies, vol. Fascicle III.4 of Blue Book, pp. 175-184. ITU, Geneva, 1989.

ITU-T. Recommendation G.729, Coding of Speech at 8 kbps using Conjugate-Structure Algebraic-Code-Excited Linear-Prediction (CS-ACELP). ITU, Geneva, Mar. 1996.

Speech Compression, http://www.data-compression.com/speech.shtml, accessed May 2005.

Stein, L. D. and Stewart, J. N., "The World Wide Web Security FAQ, Version 3.1.2, Feb. 4, 2002," http://www.w3.org/Security/Faq/.

Tyson, Jeff and Valdes, Robert, "How VoIP Works" http://computer.howstuffworks.com/ip-telephony.htm.

US Congress, CAN-SPAM Act of 2003, http://www.spamlaws.com/federal/108s877.shtml.

International Search Report and Written Opinion of the International Searching Authority for PCT/US2006/035903 dated Apr. 23, 2007.

International Search Report and Written Opinion for PCT/US2007/014871 dated Sep. 11, 2008.

Hidden Markov Model Toolkit, http://htk.eng.cam.ac.uk/; Sep. 9, 2005; accessed though www.archive.org on Jul. 9, 2007.

http://www.bell-labs.com/project/tts/voices.html; Sep. 11, 2005; accessed though www.archive.org on Jul. 9, 2007.

http://www.dli2.nsf.gov/; Nov. 28, 2003.

http://www.ipodder.org/; Sep. 4, 2005; accessed though www.archive.org on Jul. 9, 2007.

http://www.microsoft.com/reader/developers/downloads/tts.asp; Sep. 8, 2005; accessed though www.archive.org on Jul. 9, 2007.

http://www.naturalvoices.att.com/; Sep. 13, 2005; accessed though www.archive.org on Jul. 9, 2007.

Tyson, Jeff and Valdes, Robert, "How VoIP Works" http://computer.howstuffworks.com/ip-telephony.htm; Sep. 23, 2006; accessed though www.archive.org on Jul. 9, 2007.

International Search Report and Written Opinion for PCT/US2006/031499 dated Dec. 7, 2007, 5 pages.

International Search Report and Written Opinion for PCT/US2007/073290 dated Apr. 15, 2008, 9 pages.

International Search Report and Written Opinion for PCT/US2007/073298 dated Aug. 21, 2008, 11 pages.

Official Action for U.S. Appl. No. 12/189,151, mailed Dec. 29, 2011.

Official Action for U.S. Appl. No. 11/502,244, mailed Sep. 30, 2010, 12 pages.

Final Official Action for U.S. Appl. No. 11/502,244, mailed Jun. 21, 2011, 18 pages.

Official Action for U.S. Appl. No. 10/917,771, mailed May 12, 2009, 11 pages.

Final Official Action for U.S. Appl. No. 10/917,771, mailed Feb. 22, 2010, 12 pages.

Notice of Allowance for U.S. Appl. No. 10/917,771, mailed Dec. 23, 2010, 4 pages.

Official Action for U.S. Appl. No. 12/189,151, mailed Oct. 10, 2013, 19 pages.

Notice of Allowance for U.S. Appl. No. 11/502,244, mailed Jul. 9, 2013, 17 pages.

Final Action for U.S. Appl. No. 12/189,151, mailed Jan. 4, 2013, 22 pages.

* cited by examiner

FIG. 11 Classifier Subsystem

FIG. 12 Response Subsystem

FIG. 13
Validation Subsystem

FIG. 14
Control System

SYSTEM, METHOD AND APPARATUS FOR CLASSIFYING COMMUNICATIONS IN A COMMUNICATIONS SYSTEM

PRIORITY CLAIM

This patent application is a non-provisional application of U.S. provisional patent application 60/717,065 filed on Sep. 14, 2005 and entitled "System, Method and Apparatus for Classifying Communications in a Communications System," which is hereby incorporated by reference in its entirety.

CROSS-REFERENCE TO RELATED APPLICATIONS

This application is related to U.S. patent application Ser. No. 10/917,771 filed Aug. 13, 2004 entitled "System and Method for Detecting and Preventing Denial of Service Attacks in a Communications System", U.S. Patent Application Ser. No. 60/706,950 filed Aug. 9, 2005 entitled "A System, Method and Apparatus for Providing Security in a Voice Over Internet Protocol Communication System" and U.S. patent application Ser. No. 11/502,244 filed Aug. 9, 2006 entitled "System and Method for Providing Network Level and Nodal Level Vulnerability Protection in VoIP Networks", all of which are incorporated herein by reference.

FIELD OF THE INVENTION

The present invention relates generally to the field of communications and, more particularly, to a system, method and apparatus for classifying communications in a Voice over Internet Protocol communication system.

BACKGROUND OF THE INVENTION

Voice over Internet Protocol ("VoIP") is the technology of choice in voice communications, whether as green-field deployment or as upgrade to existing Time Division Multiplex ("TDM") networks, because of its demonstrated efficiencies and potential for productivity improvements. Security measures to ward off the new and unique threats arising from VoIP have largely been ignored in the race to get VoIP technologies to both wired and wireless environments. Voice Spam, Voice Mail Spam, stealth Denial of Service ("DoS") (low frequency but constant calls to the same number) are all examples of heretofore unknown problems that can completely disable any or all user devices and services, as well as the entire VoIP system itself. As has happened with email, once IP telephone calls can originate from anyplace in the world, at a near zero cost per call, such threats could impact anyone, anywhere.

Dealing with both internal and external threats to secure data networks from DoS, Distributed DoS ("DDoS"), and spam is well known to the data world. In voice networks, however, these same threats have significantly amplified impacts because the telephone and its related services are personal, real-time, and interactive. Imagine a phone ringing regularly in the middle of the night because of a spammer, or all phones in an enterprise ringing constantly due to a DoS attack, or entire voice mail systems being completely filled overnight with spam (and then each individual having to clear out their voice mailbox manually in the morning).

Meanwhile, the deployment of VoIP in enterprises, wireline carrier and wireless carrier networks is exploding. Extensive VoIP deployment is imminent in wireless networks as well (e.g., Unlicensed Mobile Access ("UMA") networks). "Dual Mode" mobile phones are now providing voice services using VoIP over WiFi when available, and cellular elsewhere. These Dual Mode phones combine the better in-building coverage and reduced cost of WiFi hotspots with the broad geographic reach of cellular. Further, as the mobile phones are upgraded to the IP Multimedia Subsystem ("IMS") standard, VoIP shall be ubiquitously used even over the wide area cellular networks.

The newest and soon to be ubiquitous VoIP, Video & Multimedia standard is the Session Initiation Protocol ("SIP"). In addition to SIP-based desk phones, SIP-based soft-phones are being incorporated into personal computers ("PCs"), laptops, personal data assistants ("PDAs"), and Smart-phones (IMS). All of these VoIP communication systems, SIP, IMS and UMA, are all vulnerable to inappropriate VoIP signaling and/or media streams that can attack an individual or an entire enterprise. Current security management products for VoIP, although necessary and effective for what they do, cannot provide the needed functionality to stop VoIP specific attacks like Stealth DoS, Stealth DDoS, and Voice/Voice Mail Spam.

Among other security issues, there is the emerging problem of Voice and Voice Mail Spam. Spam is traditionally viewed as unsolicited commercial email which recipients cannot choose to refuse. Spam accounts for over half of email traffic and incurs storage costs for recipients as well as costs associated with time lost accessing, reviewing and discarding unwanted content. Many of the emails are also fraudulent, deceptive or obscene and most are certainly unwanted. The presence of large caches of spam in a user's inbox makes it difficult to find useful email. Laws have been passed around the world to deal with the problem of spam though it continues to be ubiquitous. One significant reason for the success of spam is the ability of solicitors to automatically generate personalized content and email addresses in ways that deceives the recipients into reading or even acting on the spam.

Many of the problems of email spam can be duplicated through unsolicited voice messages or calls using VoIP. In particular, personalized messages can be sent to unsuspecting users deceiving them into taking undesired actions. Because the incremental cost of launching such attacks approaches zero with VoIP, the situation could become as it is today where the majority of email traffic is spam. Actually, compared to email, Voice Spam is much more costly for both individuals and the enterprise, since it has to be dealt with in real-time, either by actually answering the unwanted call (which may not even be a call at all), or by sifting through all of one's voice mails to see which if any are indeed real. Current telephone features allow a user to block certain phone numbers such as those from registered telemarketers. Unfortunately, VoIP will make it easier for spammers to impersonate phone numbers and send content from numbers that are not blocked.

It even gets trickier because legitimate telemarketers are shifting to VoIP (Do Not Call lists are unenforceable in a VoIP), and since some individuals respond positively to such telemarketing, what is defined as spam for one person may be acceptable to another. Further compounding the impact on both individuals and corporations, Voice Mail storage is costly and limited. A fairly simple attack scenario could be used to fill up the entire Voice Mail system of an enterprise so that every single employee would have to clear out their Voice Mail boxes before they could receive any legitimate ones, not to mention whatever messages callers were unable to leave in the meantime because the Voice Mail box capacity had been maxed out.

Certainly, repeated episodes of DoS, DDoS or Voice Spam, or perhaps even merely continued fears of such attacks by customers, trading partners and employees, could easily cause a dramatic reduction in an organization's ability to conduct business. In this circumstance, telecom vendors should expect most enterprises and consumers to take their business elsewhere. In some jurisdictions, local, state and federal government customers may even be forced by law to move to a new provider. Alternatively, and with equally devastating impacts, entire blocks of VoIP phones could be attacked, so that large subnets could effectively be rendered useless. Again, the subsequent business impact and loss of competitive positioning to impacted enterprise as well as the underlying VoIP vendors would be severe.

Accordingly, there is a need for a system, method and apparatus for automatically classifying voice communications, such as voice messages and phone calls in prerecorded voicemails (one speaker) and two-way conversations, as either spam or legitimate signals in a communications system (e.g., SIP, IMS, UMA, etc.).

SUMMARY OF THE INVENTION

The present invention provides a system, method and apparatus for automatically classifying voice communications, such as voice messages and phone calls in prerecorded voicemails (one speaker) and two-way conversations, as either spam or legitimate signals in a communications system (e.g., SIP, IMS, UMA, etc.). Spam typically includes machine-generated speech, commercial advertisements, and narrations (or individuals reading from a script). Moreover, the present invention processes signals encoded in a variety of formats (like G.729 and AMR) and possibly packed into routing and transport protocol (RTP) packets. The present invention is scalable to work on a large number of signals. This means that the algorithms, after they are validated, should be optimized for speed. This also means that the number of parameters or properties extracted from the speech signals should be minimized. The present invention also provides "soft decisions" which can be used to adjust rules that govern processes in other devices or systems. For example, the present invention can be used to give a trust score to users based on the classification of the signals they send. Alternatively, the present invention can be configured to execute actions (such as blocking or deleting) on the signals it processes. Moreover, the present invention provides interfaces and mechanisms to correct incorrect decisions by updating or retraining classification models and algorithms.

The spam detection process is divided into two phases. The first phase operates on the speech signal to extract properties that can be used to train machine learning models. These properties include energy and pitch characteristics of the uncompressed Pulse Code Modulation (PCM) form of the signal as well as statistical properties of parameters generated by encoding using different standards. Prior to the execution of this phase, the signal is encoded or decoded to the appropriate formats for each property extraction method. The second phase processes these properties using standard machine learning models, such as decision trees, neural networks and Bayesian networks. The present invention can use an open implementation of these models called WEKA (released under a GNU GPL license), but the architecture is loosely coupled allowing the use of other implementations.

More specifically, the present invention provides a method for classifying a voice communication session by receiving one or more voice communication packets associated with the voice communication session, extracting one or more properties from the received voice communication packets and classifying the voice communication session based on the extracted properties. The present invention can also be implemented as a computer program embodied on a computer readable medium wherein each step is performed by one or more code segments.

The present invention also provides an apparatus for classifying a voice communication session that includes an interface and a processor communicably coupled to the interface. The interface receives one or more voice communication packets associated with the voice communication session. The processor extracts one or more properties from the received voice communication packets and classifies the voice communication session based on the extracted properties.

In addition, the present invention provides a system that includes a first interface communicably coupled to a private IP network, a second interface communicably coupled to a public IP network, a firewall or filter communicably coupled to the first interface and second interface, and a voice communication classifier communicably coupled to the firewall or filter. The voice communication classifier receives one or more voice communication packets associated with a voice communication session, extracts one or more properties from the received voice communication packets and classifies the voice communication session based on the extracted properties.

The present invention is described in detail below with reference to the accompanying drawings.

BRIEF DESCRIPTION OF THE DRAWINGS

The above and further advantages of the invention may be better understood by referring to the following description in conjunction with the accompanying drawings, in which.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention. The discussion herein relates primarily to Voice over Internet Protocol ("VoIP") communications, but it will be understood that the concepts of the present invention are applicable to any packet-based data or voice communication system using Session Initiation Protocol ("SIP"), IP Multimedia Subsystem ("IMS"), Unlicensed Mobile Access ("UMA") or similar protocols.

The present invention provides a system, method and apparatus for automatically classifying voice communications, such as voice messages and phone calls in prerecorded voicemails (one speaker) and two-way conversations, as either spam or legitimate signals in a communications system (e.g., SIP, IMS, UMA, etc.). Spam typically includes machine-generated speech, commercial advertisements, and narrations (or individuals reading from a script). Moreover, the present invention processes signals encoded in a variety of formats (like G.729 and AMR) and possibly packed into RTP packets. The present invention is scalable to work on a large number of signals. This means that the algorithms, after they are validated, should be optimized for speed. This also means that the number of parameters or properties extracted from the speech signals should be minimized. The present invention also provides "soft decisions" which can be used to adjust rules that govern processes in other devices or systems. For example, the present invention can be used to give a trust score to users based on the classification of the signals they send. Alternatively, the present invention can be configured to execute actions (such as blocking or deleting) on the signals it processes. Moreover, the present invention provides interfaces and mechanisms to correct incorrect decisions by updating or retraining classification models and algorithms.

The spam detection process is divided into two phases. The first phase operates on the speech signal to extract properties that can be used to train a standard machine learning model. These properties include energy and pitch characteristics of the uncompressed linear PCM form of the signal as well as statistical properties of parameters generated by encoding using different standards. Prior to the execution of this phase, the signal is encoded or decoded to the appropriate formats for each property extraction method. The second phase processes these properties using standard machine learning models, such as decision trees, neural networks and Bayesian networks. The present invention can use an open implementation of these models called WEKA (released under a GNU GPL license), but the architecture is loosely coupled allowing the use of other implementations.

Figure 1:
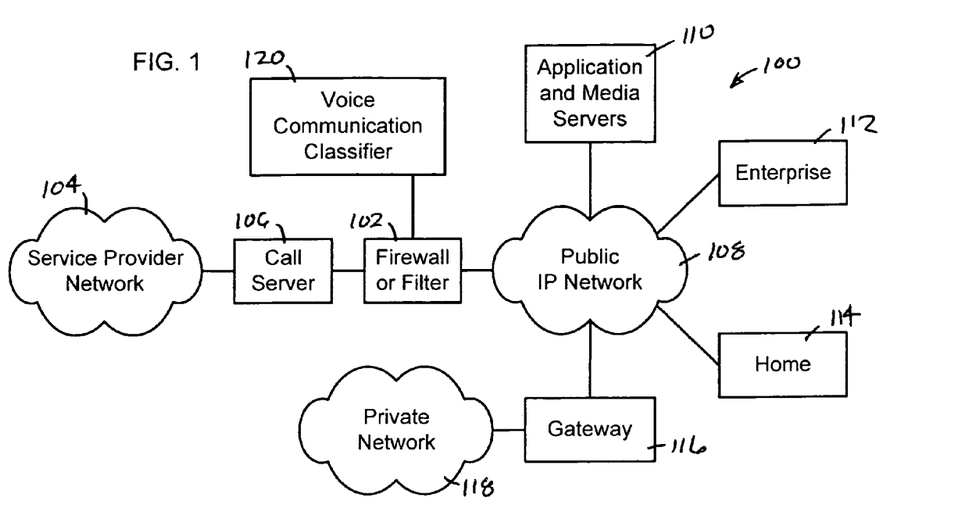
FIG. 1 is a block diagram of a network solution for classifying voice communications in accordance with one embodiment of the present invention.
Figure 3:
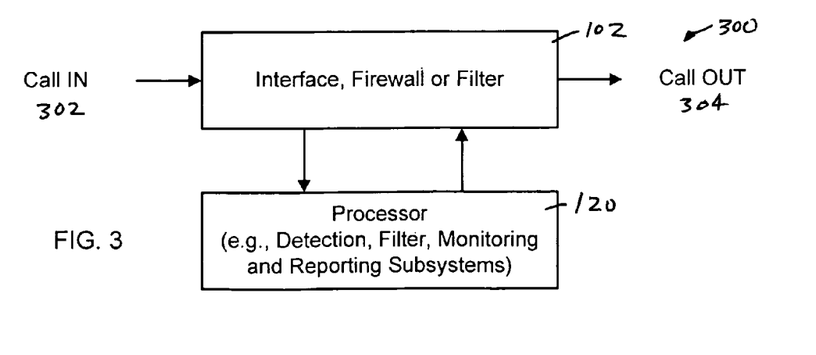
FIG. 3 is a block diagram of a system for classifying voice communications in accordance with one embodiment of the present invention.
Figure 4:
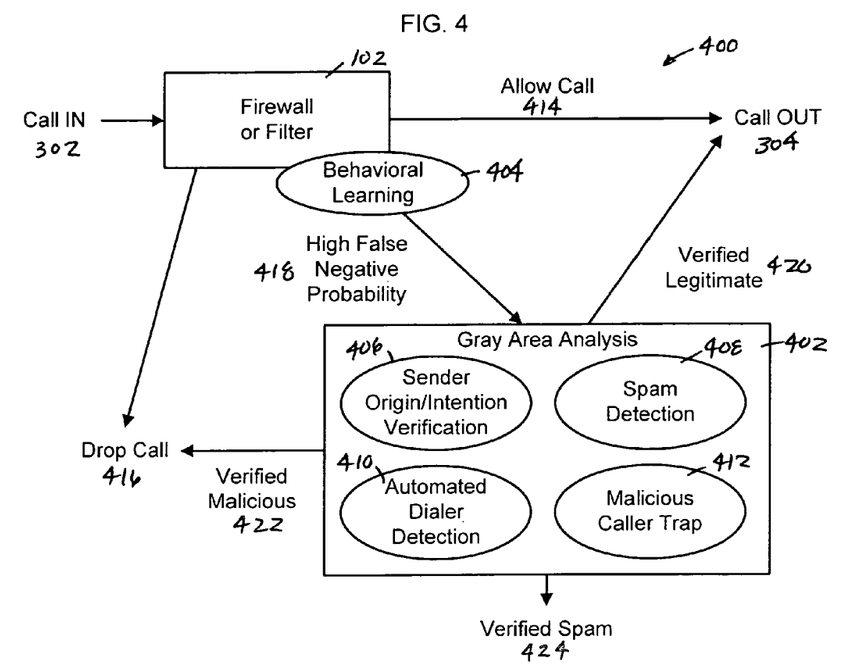
FIG. 4 is a block diagram of a system for classifying voice communications in accordance with another embodiment of the present invention.

Now referring to FIG. 1, a block diagram of a network solution 100 for classifying voice communications in accordance with one embodiment of the present invention is shown. The network solution 100 includes a firewall or filter 102 that is communicably coupled to a private IP network or service provider network 104 via a first interface (not shown) and call server 106. Firewall or filter 102 is also communicably coupled to a public IP network (e.g., Internet) 108 via a second interface (not shown). Various applications, devices and servers, such as application and media servers 110, enterprises (businesses) 112, homes and single computers/communication devices 114, are communicably coupled to the public IP network 108. Private networks 118 may also be communicably coupled to public IP network 108 via gateway 116. A voice communication classifier, as shown in FIGS. 3 and 4, is communicably coupled to the firewall or filter 102. As will be further described below, the voice communication classifier 120 receives one or more voice communication packets associated with a voice communication session, extracts one or more properties from the received voice communication packets and classifies the voice communication session based on the extracted properties. The voice communication session will typically comply with a SIP, an IMS or a UMA communications standard.

The voice communication classifier classifies the voice communication session as a legitimate call or a spam call. Alternatively, the voice communication classifier may further classify the voice communication as a casual conversation, a commercial advertisement, a machine-generated speech, a scripted narration or an unknown call type. Based on this classification, the firewall or filter 102 will take the appropriate action (e.g., report the classification, provide validation data, take no action, allow the voice communication session, drop the voice communication session, process the voice communication session as spam or challenge an originator of the voice communication session, etc.). Moreover, the present invention can operate in specialized modes that process/classify casual conversations and voice mail messages using different criteria or models. Note that the voice communication classifier can be a stand alone unit or integrated into the firewall or filter 102, just as the firewall or filter 102 can be a stand alone unit or integrated into call server 106.

Figure 2:
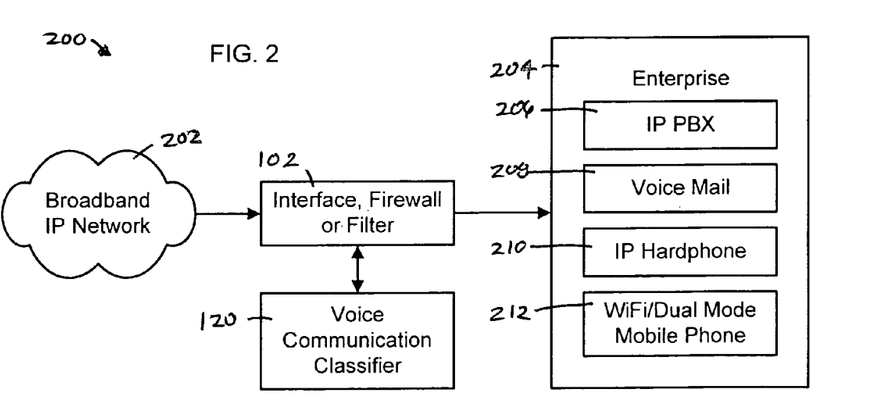
FIG. 2 is a block diagram of an enterprise solution for classifying voice communications in accordance with one embodiment of the present invention.

Referring now to FIG. 2, a block diagram of an enterprise solution 200 for classifying voice communications in accordance with one embodiment of the present invention is shown. The network solution 200 includes an interface, a firewall or filter 102 that is communicably coupled to a broadband IP network 202 via a first interface (not shown). Interface, firewall or filter 102 is also communicably coupled to an enterprise 204 via a second interface (not shown). Enterprise 204 may contain various devices, such as IP PBX 206, voice mail 208, IP hardphones 210, WiFi/dual mode mobile phones 212, etc. A voice communication classifier 120, as shown in FIGS. 3 and 4, is communicably coupled to the firewall or filter 102. As will be further described below, the voice communication classifier receives one or more voice communication packets associated with a voice communication session, extracts one or more properties from the received voice communication packets and classifies the voice communication session based on the extracted properties. The voice communication session will typically comply with a SIP, an IMS or a UMA communications standard.

The voice communication classifier classifies the voice communication session as a legitimate call or a spam call. Alternatively, the voice communication classifier may further classify the voice communication as a casual conversation, a commercial advertisement, a machine-generated speech, a scripted narration or an unknown call type. Based on this classification, the firewall or filter 102 will take the appropriate action (e.g., report the classification, provide validation data, take no action, allow the voice communication session, drop the voice communication session, process the voice communication session as spam or challenge an originator of the voice communication session, etc.). Note that the voice communication classifier 120 can be a stand alone unit or integrated into the firewall or filter 102.

Now referring to FIG. 3, a block diagram of a system 300 for classifying voice communications in accordance with one embodiment of the present invention is shown. The system 300 includes an interface, firewall or filter 102 that receives VoIP calls (Call IN) 302, processes them and then transmits those VoIP calls (Call OUT) 304 that pass various rules, parameters or criteria. The system 300 also includes a processor 120 that performs various detection, filtering, monitoring and reporting functions or an equivalent set of subsystems communicably coupled to the interface, firewall or filter 102. Accordingly, the system can be described as: (a) an interface or firewall or filter 102; and (b) a processor or detection, filter, monitoring and reporting subsystems 120 communicably coupled to the interface 102. The interface 102 receives one or more voice communication packets associated with a voice communication session. The processor 120 extracts one or more properties from the received voice communication packets and classifies the voice communication session based on the extracted properties. The voice communication session will typically comply with a SIP, an IMS or a UMA communications standard.

Figure 5:
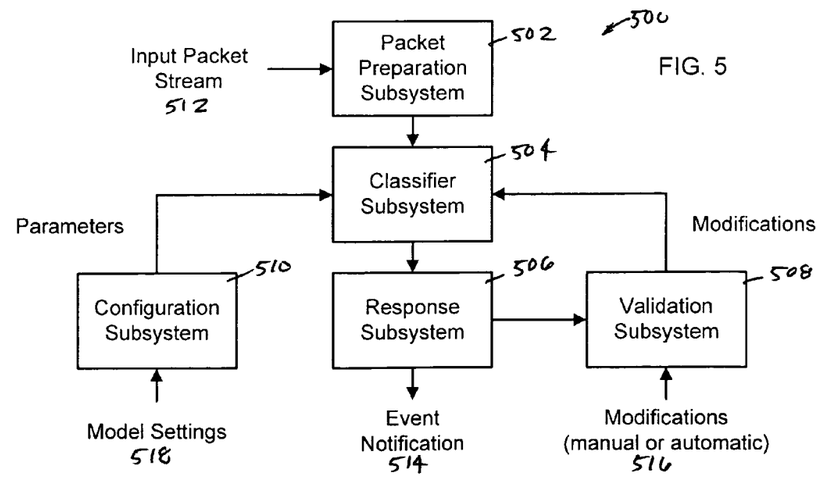
FIG. 5 is a block diagram of an apparatus for classifying voice communications in accordance with one embodiment of the present invention.
Figure 6:
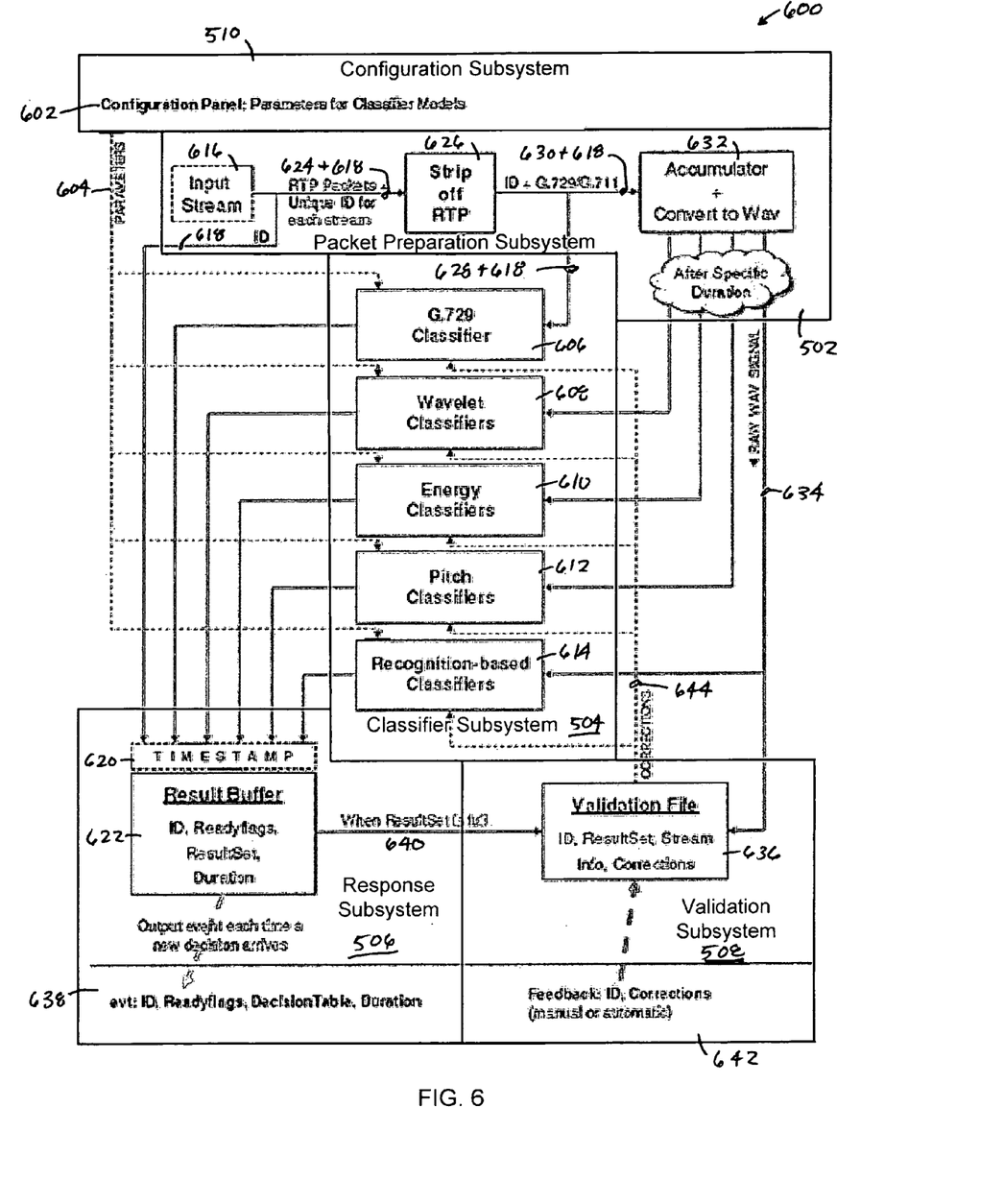
FIG. 6 is a block diagram of an apparatus for classifying voice communications in accordance with another embodiment of the present invention.

The processor 120 classifies the voice communication session as a legitimate call, a spam call, a casual conversation, a commercial advertisement, a machine-generated speech, a scripted narration or an unknown call type. Based on this classification, the interface, firewall or filter 102 will take the appropriate action (e.g., report the classification, provide validation data, take no action, allow the voice communication session, drop the voice communication session, process the voice communication session as spam or challenge an originator of the voice communication session, etc.). More specifically, the processor 120 can be configured as shown in FIGS. 4, 5 and 6. In addition, the processor 120 can execute the methods shown in FIGS. 7, 10-13. Similarly, interface, firewall or filter 102 can execute the method describe in FIG. 14. Note that the processor 120 can be a stand alone unit or integrated into the interface, firewall or filter 102.

Referring now to FIG. 4, a block diagram of a system 400 for classifying voice communications in accordance with another embodiment of the present invention is shown. The system 400 includes a firewall or filter 102 that receives VoIP calls (Call IN) 302, processes them and then transmits those VoIP calls (Call OUT) 304 that pass various rules, parameters or criteria. The system 400 also includes various detection, filter; monitoring and reporting subsystems that perform a gray area analysis 402 based on behavioral learning 404. The gray area analysis 402 may include sender origin/intention verification 406, spam detection 408, automated dialer detection 410, malicious caller trap 412 and other processes or modules. The gray area analysis 402, sender origin/intention verification 406, spam detection 408, automated dialer detection 410 and malicious caller trap 412 are further described in U.S. Patent Application Ser. No. 60/706,950 filed Aug. 9, 2005 entitled "A System, Method and Apparatus for Providing Security in a Voice Over Internet Protocol Communication System" and U.S. patent application Ser. No. 11/502,244 filed Sep. 9, 2006 entitled "System and Method for Providing Network Level and Nodal Level Vulnerability Protection in VoIP Networks", which are incorporated herein by reference. The following description will provide details of a voice classifier that is part of the gray area analysis 402, such as spam detection 408. Using gray area analysis 402, the system 400 allows calls 414, drops calls 416 or further investigates calls that have a high false negative probability 418. The calls that have a high false negative probability 418 will either be processed as: (a) verified legitimate calls 420 and allowed (Call OUT 304); or (b) verified malicious calls 422 and dropped (Drop Call 416). Note that calls that have a high false negative probability 418 can also be processed as verified spam calls 424 and placed into voice mail, storage or other specified destination.

Now referring to FIG. 5, a block diagram of an apparatus 500 for classifying voice communications in accordance with one embodiment of the present invention is shown. The apparatus 500 includes a packet preparation subsystem 502, a classifier subsystem 504, a response subsystem 506, a validation subsystem 508 and a configuration subsystem 510. The packet preparation subsystem 502 is communicably coupled to an interface (not shown) that provides an input packet stream 512. The packet preparation subsystem 502 receives the one or more voice communication packets associated with a voice communication session and processes them to provide the necessary inputs to the classifier subsystem 504. The classifier subsystem 504 is communicably coupled to the packet preparation subsystem 502 and includes one or more classifiers that analyze the various properties of the voice communication session. The response subsystem 506 is communicably coupled to the classifier subsystem 504. The response subsystem 506 receives the output from the classifier subsystem 504 and provides the appropriate event notifications 514 when necessary. The response subsystem 506 also provides data to the validation subsystem 508 that is used to modify or update the parameters and models of the classifier subsystem 504. The validation subsystem 508 is communicably coupled to the packet preparation subsystem 502, the classifier subsystem 504 and the response subsystem 506. The validation subsystem 508 receives data from the response subsystem 506 and modifications 516 from a control system or other interface that are in turn manually or automatically sent to the classifier subsystem 502 to adjust the parameters and models of the one or more classifiers within the classifier subsystem 502. The configuration subsystem 510 is communicably coupled to the classifier subsystem 504 and receives parameters and models 518 from a control system or other interface that are used to configure the classifier subsystem 504. The processing provided by these subsystems is further described in reference to FIG. 7 (system as a whole), FIG. 10 (packet preparation subsystem 502), FIG. 11 (classifier subsystem 504), FIG. 12 (response subsystem 506), FIG. 13 (validation subsystem 508) and FIG. 14 (control system).

Referring now to FIG. 6, a block diagram of an apparatus 600 for classifying voice communications in accordance with another embodiment of the present invention is shown.

The apparatus 600 includes a packet preparation subsystem 502, a classifier subsystem 504, a response subsystem 506, a validation subsystem 508 and a configuration subsystem 510. The packet preparation subsystem 502 is communicably coupled to an interface (not shown) that provides an input packet stream 616 (shown in FIG. 5 as input packet stream 512). The packet preparation subsystem receives the one or more voice communication packets associated with a voice communication session and processes them to provide the necessary inputs to the classifier subsystem 504. The classifier subsystem 504 is communicably coupled to the packet preparation subsystem 502 and includes one or more classifiers that analyze the various properties of the voice communication session. The response subsystem 506 is communicably coupled to the packet preparation subsystem 502 and classifier subsystem 504. The response subsystem 506 receives the output from the classifier subsystem 504 and provides the appropriate event notifications 514 when necessary. The response subsystem 506 also provides data to the validation subsystem 508 that is used to modify or update the parameters and models of the classifier subsystem 504. The validation subsystem 508 is communicably coupled to the packet preparation subsystem 502, the classifier subsystem 504 and the response subsystem 506. The validation subsystem 508 receives data from the response subsystem 506 and manual or automatic modifications 516 from a control system or other interface that are in turn manually or automatically sent to the classifier subsystem 502 to adjust the parameters and models of the one or more classifiers within the classifier subsystem 502. The configuration subsystem 510 is communicably coupled to the classifier subsystem 504 and receives parameters and models 518 from a control system or other interface that are used to configure the classifier subsystem 504.

The configuration subsystem 510 includes a configuration panel or interface 602 that is used to provide one or more parameters 604 to each of the classifiers (e.g., codec-based (G.729, G.711, AMR, RTP) classifier 606, a wavelet classifier 608, an energy classifier 610, a pitch classifier 612, a recognition-based classifier 614, etc.) within the classifier subsystem 504.

The packet preparation subsystem 502 receives an input stream of voice communication packets 616, assigns a unique ID 618 to the packets and provides the ID 618 along with a timestamp 620 to the result buffer 622 in the response subsystem 506. The voice communication packets 624 and the unique ID 618 assigned to that stream of packets are then processed 626 to strip off the routing and transport protocols. The resulting voice communication protocol data 628 and ID 618 are sent to the codec-based (G.729, G.711, AMR, RTP) classifier 606 for processing. Likewise, the resulting voice communication data 630 and ID 618 are sent to an accumulator and codec 632 where the voice communication data 632 is accumulated and converted to one or more signals suitable for use by the wavelet classifier 608, energy classifier 610, pitch classifier 612 and recognition-based classifier 614 for processing. A raw voice communication signal 634 is also sent to a validation file 636 within the validation subsystem 508. The processing of the packet preparation subsystem 502 is further described in reference to FIG. 10.

The classifier subsystem 504 includes one or more classifiers, including but not limited to codec-based (G.729, G.711, AMR, RTP) classifier 606, wavelet classifier 608, energy classifier 610, pitch classifier 612 and recognition-based classifier 614. The one or more classifiers use decision trees, neural networks, Bayesian networks or other techniques to analyze and characterize the voice communication session as a legitimate signal or spam. The codec-based classifier 606 uses codec-based methods that perform time-series and statistical analysis of the parameters that result from encoding the speech signal using different standards. Parameters include the choice of codec parameters and statistics, and the number of codec frames to use. The wavelet classifier 608 uses a wavelet-based method that considers the time-frequency analysis of the speech signal and uses a subset of the wavelet coefficients to extract the long-term trends in frequencies. Parameters in this method include the type of wavelet to use in the time-frequency decomposition and the subset of wavelet coefficients. The energy classifier 610 uses an energy-based method that examines the variation in energy in a sequence of short frames of the signal. In particular this method uses covariance and correlation statistics to study how high- and low-energy frames interact in the signal. Parameters in this method include the length of the frames, the number of frames to consider, and the thresholding method for distinguishing between low and high energy frames. The pitch classifier 612 uses a pitch-based method that uses a super resolution pitch determination algorithm to label each frame of the signal according to its pitch. It then performs statistical analysis on the resulting time-series to extract its characteristic properties. Parameters in this method include the number of frames to use to build a time series and the lags to use in autocorrelation statistics. The recognition-based classifier 614 uses a speech recognition-based method to measure the frequency of occurrence of certain keywords that can be said to occur often in casual conversation or, alternatively, in spam-based calls. Parameters in this method include the keywords and methods for analyzing the frequency of occurrence. The processing of the classifier subsystem 504 is further described in reference to FIG. 11.

The response subsystem 506 includes a timestamp 620 and result buffer 622 that receives the ID 618 and output from the various classifiers. The result buffer 622 stores the received data (e.g., ID 618, ready flags, result set, duration, etc.) until enough data has been received for the response subsystem 506 to report an event 638 or provide data 640 to the validation file 636 in the validation subsystem 508. An example of a format of a result set is:

|  | G.729 | Wavelet | Energy | Pitch | Recognition |
| --- | --- | --- | --- | --- | --- |
| Tree model | Casual | Casual | Commercial | Casual | Casual |
| Bayesian | Casual | Casual | Commercial | Casual | Casual |
| Rule-based | Commercial | Casual | Commercial | Casual | Casual |
| Neural Net | Casual | Casual | Commercial | Casual | Casual |

An event 638 is reported each time a new decision arrives and may include the ID 618, ready flags, decision table, duration, etc. The decision table may take the form of:

| Casual | 0.9 |
| --- | --- |
| Commercial | 0.01 |
| Narration | 0.04 |
| Machine | 0.05 |

Data 640 is provided to the validation file 636 when the result set is full. The processing of the response subsystem 506 is further described in reference to FIG. 12.

The validation subsystem 508 receives and stores data 640 from the result buffer 622 and manual or automatic feedback (e.g., ID, corrections, etc.) 642 in the validation file 636. The validation file 636 may include ID 618, result set, stream information, corrections, modifications, updates, upgrades, etc. At appropriate times, the validation file 636 provides corrections 644 to one or more of the classifiers 606, 608, 610, 612 or 614 within the classifier subsystem 504. The processing of the validation subsystem 508 is further described in reference to FIG. 13.

Figure 7:
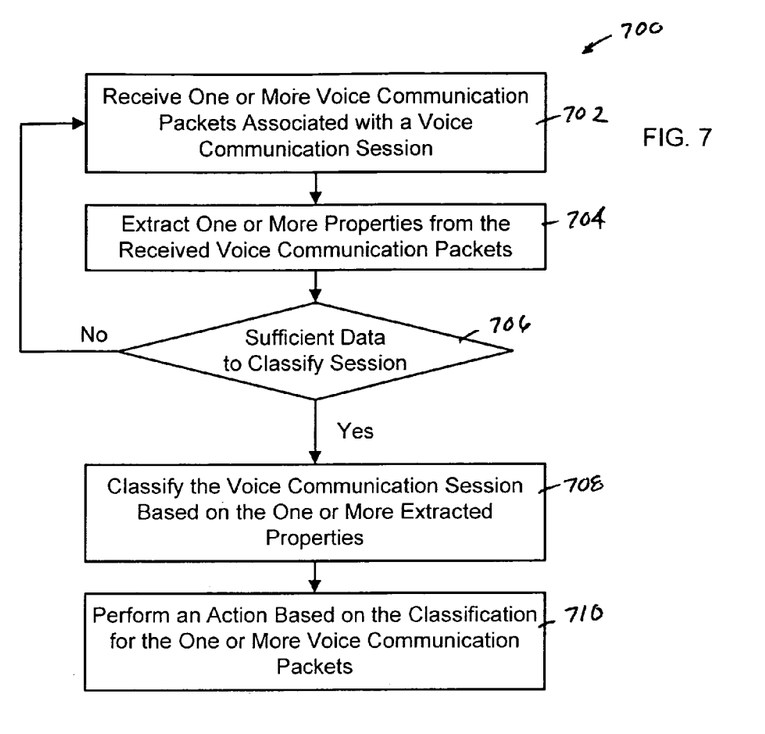
FIG. 7 is a flow chart illustrating a method for classifying voice communications in accordance with one embodiment of the present invention.

Now referring to FIG. 7, a flow chart illustrating a method 700 for classifying voice communications in accordance with one embodiment of the present invention is shown. One or more voice communication packets associated with a voice communication session are received in block 702 and one or more properties are extracted from the received voice communication packets in block 704. The voice communication session will typically comply with a SIP, an IMS or a UMA communications standard. The one or more properties are extracted from a voice protocol data or a voice communication signal encoded within the received voice communication packets. If a sufficient number of voice communication packets have not been received to classify the voice communication session, as determined in decision block 706, the process loops back to receive additional voice communication packets associated with the voice communication session in block 702 and the process repeats effectively delaying the classification of the voice communication session in block 708 until a sufficient number of voice communication packets have been received.

If, however, a sufficient number of voice communication packets have been received to classify the voice communication session, as determined in decision block 706, the voice communication session is classified based on the one or more extracted properties in block 708. The classification of the voice communication session may include a legitimate call or a spam call. Alternatively, the classification may further include a casual conversation, a commercial advertisement; a machine-generated speech, a scripted narration or an unknown call type. As previously described, one or more models or classifiers can be used to classify the voice communication session (e.g., a codec-based classification model, a wavelet classification model, an energy classification model, a pitch classification model, a recognition-based classification model, etc.). Each classification model classifies the voice communication session based on one or more parameters. Thereafter, an action based on the classification of the voice communication session is performed in block 710. The action may include reporting the classification, providing validation data, taking no action, allowing the voice communication session, dropping the voice communication session, processing the voice communication session as spam or challenging an originator of the voice communication session. The present invention can also be implemented as a computer program embodied on a computer readable medium wherein each step is performed by one or more code segments.

Various basic principles underlying the design and implementation of the present invention will now be described. Speech is usually sampled at 8000 samples per second (8 KHz). Given 8 bits per sample, this corresponds to 64 kbps. The speech signal can be compressed using a number of lossy compression methods sometimes without perceptible loss in quality. Compression methods include Adaptive Differential Pulse Coded Modulation (ADPCM-32 kbps), Low-Delay Code Excited Linear Prediction (LD-CELP-16 kbps), Conjugate-Structured Algebraic Code Excited Linear Prediction (CS-ACELP-8 kbps), Code Excited Linear Prediction (CELP-4.8 kbps), and Linear Predictive Coding (LPC10-2.4 kbps). All of these methods break up the signal into small frames and perform a linear filtering operation on these frames resulting in coefficients and parameters that describe pitch, gain, codebook indices and other parameters of the filtering and compression.

VoIP applications usually deliver content using the CS-ACELP compression method because this at 8 kbps gives the lowest compression without perceptible loss in quality. An algorithm for doing this compression is recommended in the G.729 standard published by the International Telecommunication Union (ITU). G.729 breaks the signal into 10 msec frames. At 8 KHz, this corresponds to 80 samples which are compressed into 80 bits. The following table shows the composition of each frame using bit allocation of the 8 kbit/s CS-ACELP Algorithm (10 ms frame):

| Parameter | Codeword | Sub-frame 1 | Sub-frame 2 | Total per frame |
|---|---|---|---|---|
| Line spectrum pairs | L0, L1, L2, L3 | | | 18 |
| Adaptive-codebook delay | P1, P2 | 8 | 5 | 13 |
| Pitch-delay parity | P0 | 1 | | 1 |
| Fixed-codebook index | C1, C2 | 13 | 13 | 26 |
| Fixed-codebook sign | S1, S2 | 4 | 4 | 8 |
| Codebook gains (stage 1) | GA1, GA2 | 3 | 3 | 6 |
| Codebook gains (stage 2) | GB1, GB2 | 4 | 4 | 8 |
| Total | | | | 80 |

Before the analog signal can be compressed, it needs to be sampled and converted to digital format. This is usually done using Pulse Code Modulation (PCM). G.711 is another ITU standard that encodes the signal using PCM at 64 kbps. This encoding is roughly logarithmic such that more bits are used to encode lower amplitude signals. The G.729 algorithm requires that the PCM signal undergo linear quantization to form 16-bit Linear PCM which is then the input to the G.729 encoder.

The ITU provides a software tool library that includes an implementation of the algorithms for G.711 encoding. Additional implementations of various compression algorithms and the G.711 encoding are available at http://www.datacompression.com/download.shtml. Moreover, a number of implementations of the G.729 codec are available from VIMAS Technologies, VoiceAge Corporation, and Sipro Lab Telecom among others.

The present invention relies on a sufficiently large data bank of human and machine speech samples. Machine speech is best generated using several commercially available text-to-speech engines including AT&T Natural Voices, Microsoft speech reader, and Bell Labs Text-to-Speech. Generating a large corpus of conversational human speech may be more difficult. Available resources include the Digital Libraries Initiative and podcasting archives. Call centers may also be a useful resource for both kinds of speech data.

Given an input signal encoded in either PCM or CS-ACELP format, the present invention classifies it as human-generated or machine-generated and provides a measure of certainty. Statistical-based, decision tree-based, neural network-based and rule-based methods can be used to classify the voice communication sessions. The input signal may also be partitioned into groups based on its characteristics so that groups containing machine-generated signals can be determined.

Statistical regression and correlation analysis can be used to look for relationships between different parts of the signal and the eventual classification. For example, the values of each of the fields in the G.729 can be compared on a regression plot to determine if there is any relationship between them.

Bayesian classification can also be used to establish conditional probabilities that express the frequency of occurrence of a field value with a given classification. This is a naïve approach which assumes that each field is independently related to the final classification.

Time-frequency analysis of speech signals can also yield useful information about the properties of the speech. Fourier analysis can expose the frequency content in a signal while wavelet analysis can expose trends at different levels of detail. These outputs could be combined with another analysis method such as neural networks to classify input samples.

Decision trees systematically subdivide the collection of training signals into groups based on common properties until homogeneous groups a created. Decision trees are attractive because once the tree is built; classifying an input signal can be done very quickly. The challenge with decision trees is identifying the rules that can be used to divide the signals at each step.

Neural networks are composed of nodes which are "interconnected by excitatory and inhibitory connections" (Westphal, 1998). These connections contain activation values that determine if a node should be activated based on the value of the input. Usually the nodes are arranged in layers with at least an input layer and an output layer. The output layer will usually contain two nodes representing each of the desired classifications.

The activation values are set during the training phase of the neural network. This phase can either be supervised or unsupervised. In supervised learning, a training input is fed into the neural network and its output is determined. If this does not correspond to the desired output, some feedback is sent to the neural network and activation values are adjusted such that the right value is predicted. In unsupervised learning, the neural network clusters the input into groups based on the features of the input. A determination can then be made on how well the groups align with the two classifications. These neural network models can be experimented on with different fields from the input frame or the entire frame. Neural networks can also be combined with statistical methods and decision trees to form hybrid models.

Hidden Markov models (HMMs) are popular in speech recognition applications. A model is built using a training sequence to initialize its probability distributions. Different models can be built using only machine- and only human-generated signals respectively. Then, an input signal can be compared to both models to determine which yields better recognition values. HMMs could also be used to translate the signal into sentences which can be parsed and analyzed with traditional spam detection methods to try and identify unsolicited voice messages. A common tool for building HMMs for research purposes is the HTK Speech Recognition Toolkit, which contains libraries that can be used in "speech analysis, HMM training, testing and results analysis" (Hidden Markov Model Toolkit, http://htk.eng.cam.ac.uk/).

The present invention distinguishes between human-generated and machine generated voice signals based on the presence of distinctions between the two signals in encoded form. In the compressed G.729 form some information is lost in the compression and this could include useful subtle information that the models can use to make this distinction. Hence it may be easier to analyze the uncompressed G.711 formats. Preferably, these models are extended to the compressed format because this is the standard used for transmission in VoIP.

The following tests highlight some of the challenges associated with the present invention. Human and machine speech samples were generated with the machine speech samples coming from AT&T Natural Voices. The first challenge is immediately exposed: what should the human/machine be saying? The final tests include a broad range of types of speech including questions, exclamations, assertions and advertising. Another challenge is to get a broad range of speech samples from different speakers and different machine speech generators so that the methods do not specialize to one category of speakers. In one experiment, six human speech samples and four machine samples were used. The machine samples were done with four different voice styles within AT&T Natural Voices. The following text samples were used for the test:

| Label | Text |
|---|---|
| Text1 | Did you see that shot? Is that guy great or what?! |
| Text2 | I really don't understand the purpose of this exercise. If I forget what to say, I can just look at the notecards. |
| Text3 | Warm toast? Cold toast? Burnt toast? ActiveToaster is your one-stop-shop for all your toasting needs. Now just 29.99! |
| Text4 | Hello Matthew. I would like to tell you about an exciting new text-to-speech product from Microsoft. |

Various measures, such as mean, standard deviation, and median absolute deviation can be used to generate a single value for each speech recording. These values can be plotted to reveal some trends. For example, FIGS. 8 and 9 show some of these trends.

Figure 8:
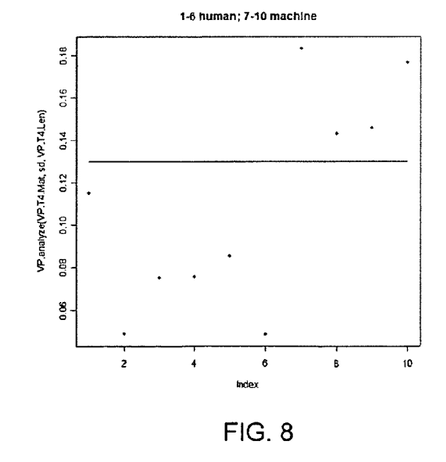
FIG. 8 is a graph illustrating that the standard deviation is often higher for machine generated samples in accordance with one embodiment of the present invention.
Figure 9:
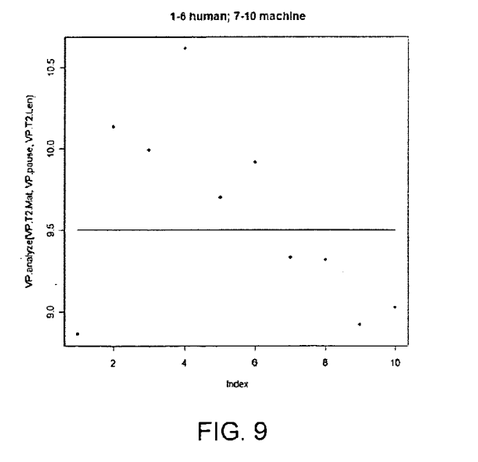
FIG. 9 is a graph illustrating that humans tend to pause more during speech than machines in accordance with one embodiment of the present invention.

FIG. 8 is a graph illustrating that the standard deviation is often higher for machine generated samples in accordance with one embodiment of the present invention. This may be because of the more choppy nature of machine speech resulting in more values away from the mean. FIG. 9 is a graph illustrating that humans tend to pause more during speech than machines in accordance with one embodiment of the present invention. A measure for capturing the number of pauses in the speech sample is shown. This heuristic is based on the observations that humans tend to pause more when they speak while machine speech only has pauses after sentences or commas. In this measure, long pauses that come after a statement are eliminated and short pauses that may occur in the middle of a sentence are captured.

Figure 10:
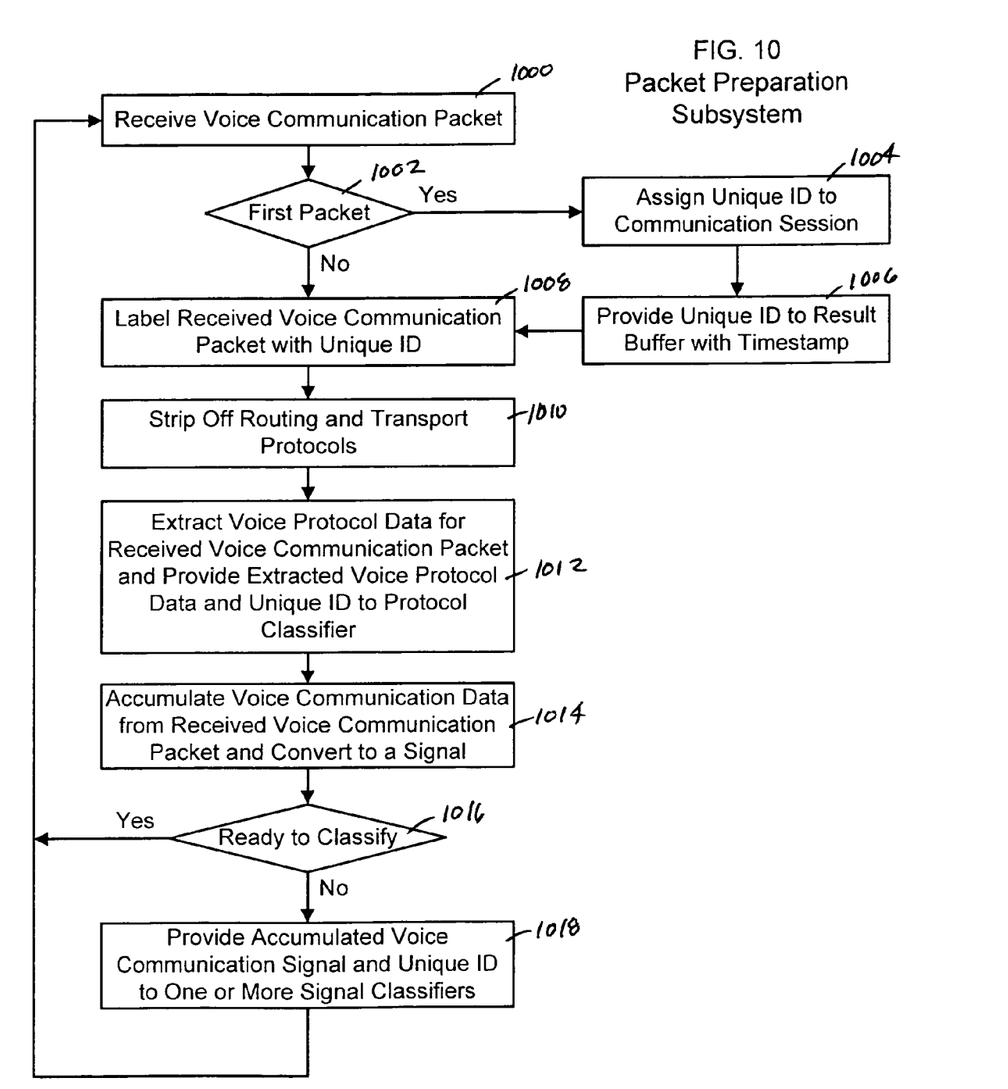
FIG. 10 is a flow chart illustrating a packet preparation subsystem in accordance with one embodiment of the present invention.

Referring now to FIG. 10, a flow chart illustrating a packet preparation subsystem 502 in accordance with one embodiment of the present invention is shown. A voice communication packet is received in block 1000. If the received voice communication packet is the first packet in a voice communication session, as determined in decision block 1002, a unique ID is assigned to the voice communication session in block 1004 and the unique ID is provided to a result buffer with timestamp in block 1006. Thereafter, or if the received voice communication packet is not the first packet in the voice communication session, as determined in decision block 1002, the received voice communication packet is labeled with the unique ID in block 1008 and the routing and transport protocols are stripped off the labeled voice communication packet in block 1010. Voice protocol data is extracted from the received voice communication packet and is provided to a codec-based or protocol classifier along with the unique ID in block 1012. Voice communication data is extracted from the received voice communication packet and is accumulated and converted to one or more voice communication signals in block 1014. If a sufficient amount of data has not been accumulated to classify the voice communication session, as determined in decision block 1016, the process loops back to block 1000 where another voice communication packet is received and processed as previously described. If, however, a sufficient amount of data has been accumulated to classify the voice communication session, as determined in decision block 1016, the one or more accumulated voice communication signals and unique ID are provided to the one or more signal classifiers in block 1018 and the process loops back to block 1000 where another voice communication packet is received and processed as previously described.

Figure 11:
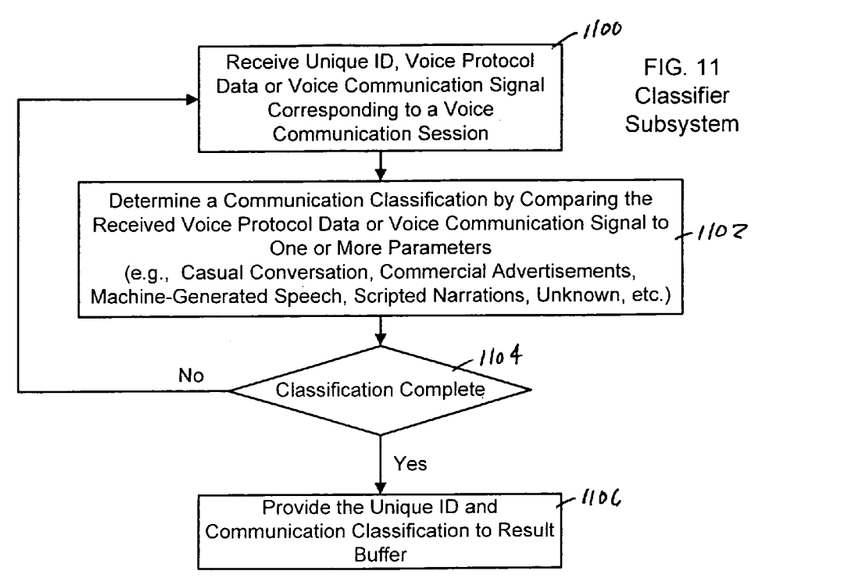
FIG. 11 is a flow chart illustrating a classifier subsystem in accordance with one embodiment of the present invention.

Now referring to FIG. 11, a flow chart illustrating a classifier subsystem 504 in accordance with one embodiment of the present invention is shown. A unique ID, voice protocol data or one or more voice communication signals corresponding to a voice communication session are received in block 1100. A communication classification for the voice communication session is determined by comparing the voice protocol data or one or more voice communication signals to one or more parameters in block 1102. The voice communication session can be classified as a legitimate call, a spam call, a casual conversation, a commercial advertisement, a machine-generated speech, a scripted narration or an unknown call type. If the classification is not complete, as determined in decision block 1104, the process returns to block 1100 where additional information for the voice communication is received and analyzed in block 1102. If, however, the classification is complete, as determined in decision block 1104, the unique ID and communication classification are provided to the result buffer in block 1106.

Figure 12:
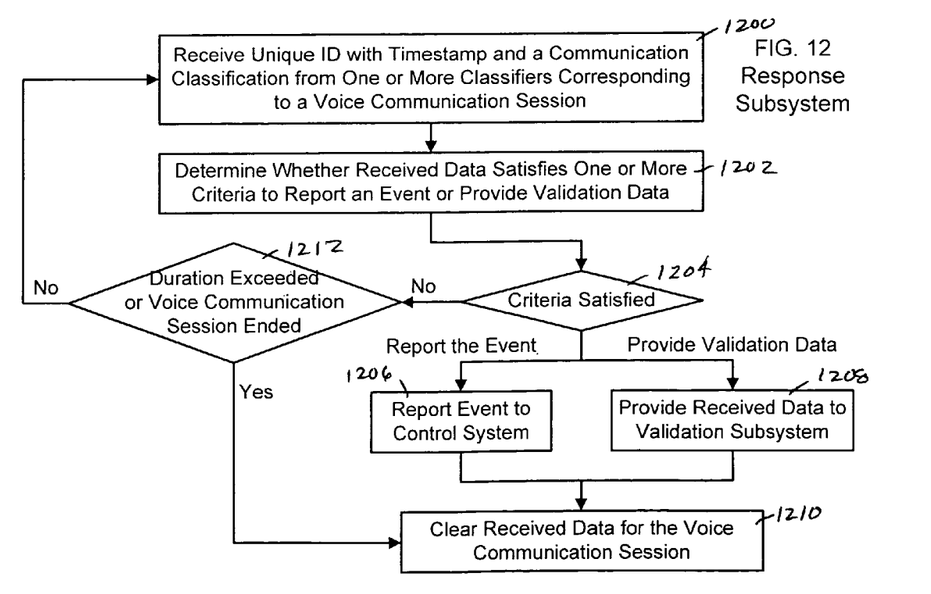
FIG. 12 is a flow chart illustrating a response subsystem in accordance with one embodiment of the present invention.

Referring now to FIG. 12, a flow chart illustrating a response subsystem 506 in accordance with one embodiment of the present invention is shown. A unique ID with timestamp and a communication classification for the voice communication session are received from one or more classifiers in block 1200 and a determination is made in block 1202 whether the received data satisfies one or more criteria to report an event or provide validation data. If the criteria are satisfied, as determined in decision block 1204, an event is reported to the control system in block 1206 or the received data is provided to the validation subsystem in block 1208. Thereafter, the received data for the voice communication is cleared in block 1210. If, however, the criteria are not satisfied, as determined in decision block 1204, and either a duration has been exceeded or the voice communication session has ended, as determined in decision block 1212, the received data for the voice communication is cleared in block 1210. If, however, the duration has not been exceeded and the voice communication session has not ended, as determined in decision block 1212, additional information is received in block 1200 and the process continues as previously described.

Figure 13:
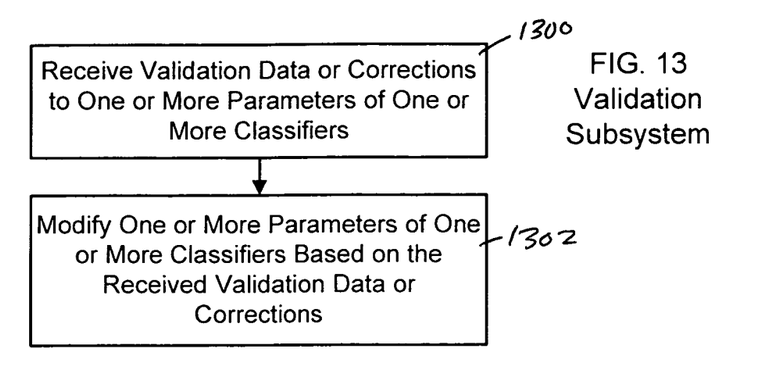
FIG. 13 is a flow chart illustrating a validation subsystem in accordance with one embodiment of the present invention.

Now referring to FIG. 13, a flow chart illustrating a validation subsystem 508 in accordance with one embodiment of the present invention is shown. Validation data or corrections to one or more parameters of one or more of the classifiers are received in block 1300. Some time thereafter, either automatically or manually, the one or more parameters of the one or more classifiers are modified based on the received validation data or corrections in block 1302. The modifications to the one or more classification models or the one or more parameters can be based on current operational data, historical operational data, user preferences, system preferences or feedback. The modifications to the one or more classification models or the one or more parameters can be performed to correct one or more previous incorrect classifications. In addition, the one or more one or more classification models can be trained using the properties extracted by the classifiers.

Figure 14:
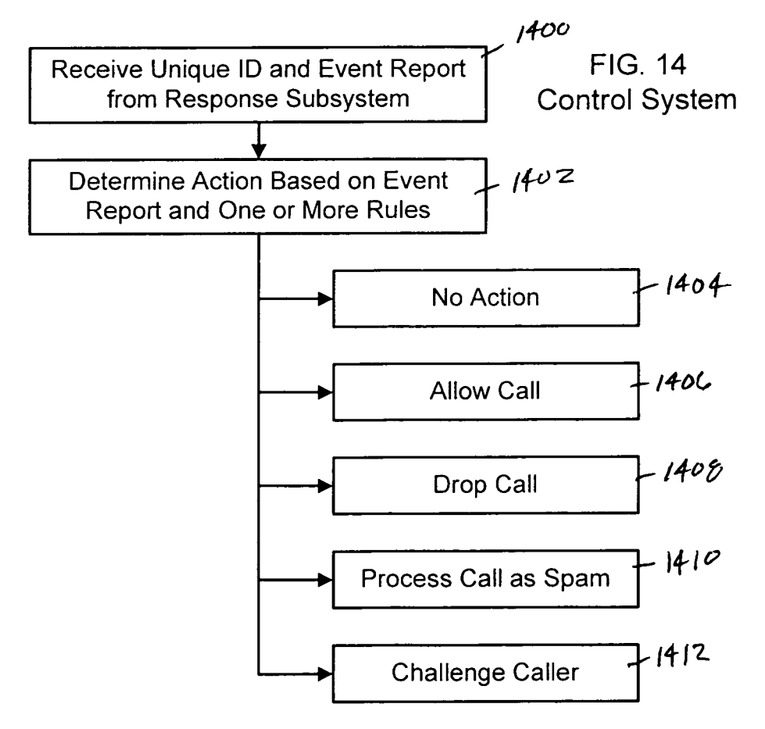
FIG. 14 is a flow chart illustrating a control system in accordance with one embodiment of the present invention.

Referring now to FIG. 14, a flow chart illustrating a control system in accordance with one embodiment of the present invention is shown. A unique ID and event report are received from the response subsystem block 1400 and an action is determined based on the event report and one or more rules in block 1402. The action may include no action 1404, allowing the call 1406, dropping the call 1408, processing the call as a span call 1410 or challenging the caller 1412.

REFERENCES

L. D. Stein and J. N. Stewart, The World Wide Web Security FAQ, Version 3.1.2, Feb. 4, 2002, http://www.w3.org/Security/Faq/
US Congress, CAN-SPAM Act of 2003, http://www.span-laws.com/federal/108s877.shtml
D. E. Sorkin, Spam Laws, http://www.spamlaws.com/, accessed May 2005.
Jeff Tyson and Robert Valdes, How VoIP Works http://computer.howstuffworks.com/ip-telephony.htm
Speech Compression, http://www.data-compression.com/speech.shtml, accessed May 2005.
ITU-T. Recommendation G.729, Coding of Speech at 8 kbps using Conjugate-Structure Algebraic-Code-Excited Linear-Prediction (CS-ACELP). ITU, Geneva, March 1996.
ITU-T. Recommendation G.711, Pulse code molulation (PCM) of voice frequencies, volume Fascicle 111.4 of Blue Book, pages 175-184. ITU, Geneva, 1989.
ITU-T. Recommendation G.191, Software Tool Library 2000 User's Manual. ITU, Geneva, December 2000.
Data Compression Download Source Codes and Papers. http://www.data-compression.com/download.shtml, accessed May 2005.
Commercial Libraries, Data Compression—Speech, http://datacompression.info/Speech.shtml, accessed May 2005.
http://www.naturalvoices.att.com/
http://www.microsoft.com/reader/developers/downloads/tt-s.asp
http://www.bell-labs.com/project/tts/voices.html
http://www.dli2.nsf.gov/
http://www.ipodder.org/
M. Dunham. Data Mining—Introductory and Advanced Topics, Prentice Hall, Upper Saddle River, N.J., 2003.
C. Westphal and T. Blaxton, Data Mining Solutions—Methods and Tools for Solving Real-World Problems, Wiley Computer Publishing, New York, N.Y., 1998.
Hidden Markov Model Toolkit, http://htk.eng.cam.ac.uk/

It will be understood by those of skill in the art that information and signals may be represented using any of a variety of different technologies and techniques (e.g., data, instructions, commands, information, signals, bits, symbols, and chips may be represented by voltages, currents, electromagnetic waves, magnetic fields or particles, optical fields or particles, or any combination thereof). Likewise, the various illustrative logical blocks, modules, circuits, and algorithm steps described herein may be implemented as electronic hardware, computer software, or combinations of both, depending on the application and functionality. Moreover, the various logical blocks, modules, and circuits described herein may be implemented or performed with a general purpose processor (e.g., microprocessor, conventional processor, controller, microcontroller, state machine or combination of computing devices), a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. Similarly, steps of a method or process described herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. Although preferred embodiments of the present invention have been described in detail, it will be understood by those skilled in the art that various modifications can be made therein without departing from the spirit and scope of the invention as set forth in the appended claims.

What is claimed is:

1. A method for classifying a voice communication session comprising the steps of:
    receiving, by a microprocessor, one or more voice communication packets associated with the voice communication session;
    stripping off, by a microprocessor, one or more routing and transport protocols from the received voice communication packets to obtain one or more resulting voice data units;
    accumulating, by a microprocessor, two or more of the resulting voice data units to obtain accumulated voice data;
    converting, by a microprocessor, the accumulated voice data into at least one voice signal suitable for analysis by one or more classifiers, wherein each classifier uses one or more classification models;
    providing, by a microprocessor, the at least one voice signal to one or more classifiers;
    extracting one or more properties, by the one or more classifiers, from the at least one voice signal to obtain extracted properties;
    classifying the voice communication session as a legitimate call or a spam call based on the extracted properties, wherein the classifying includes determining whether the at least one voice signal is at least one of machine-generated speech, commercial advertisements, and narrations; and
    modifying the one or more classification models based on at least one of current operational data, historical operational data, user preferences, system preferences and feedback.

2. The method as recited in claim 1, wherein the voice communication session complies with a SIP, an IMS or a UMA communications standard.

3. The method as recited in claim 1, wherein the one or more properties are also extracted from a voice protocol data encoded within the received voice communication packets.

4. The method as recited in claim 1, wherein the classification of the voice communication session further comprises a casual conversation, a commercial advertisement, a machine-generated speech, a scripted narration or an unknown call type.

5. The method as recited in claim 1, further comprising the steps of:
    assigning a unique identifier to the voice communication session; and
    labeling the received voice communication packets with the assigned unique identifier.

6. The method as recited in claim 1, further comprising the step of determining whether a certain amount of voice data has been extracted, accumulated and converted to classify the voice signal and delaying the step of classifying the voice communication session until the certain amount of voice data has been extracted, accumulated and converted.

7. The method as recited in claim 1, further comprising the steps of:
    extracting voice protocol data from the received voice communication packets; and
    providing the voice protocol data to a codec classifier that extracts the one or more properties from the voice protocol data.

8. The method as recited in claim 1, wherein the one or more classification models comprise:
    a codec-based classification model, a wavelet classification model, an energy classification model, a pitch classification model or a recognition-based classification model; and
    each classification model classifies the voice communication session based on one or more parameters.

9. The method as recited in claim 8, further comprising the step of modifying the one or more parameters based on current operational data, historical operational data, user preferences, system preferences or feedback.

10. The method as recited in claim 1, wherein the step of modifying the one or more classification models is automatically or manually executed.

11. The method as recited in claim 1, wherein the step of modifying the one or more classification models is performed to correct one or more previous incorrect classifications.

12. The method as recited in claim 1, further comprising the step of training the one or more classification models using the extracted properties.

13. The method as recited in claim 1, wherein the one or more classification models comprise decision trees, neural networks or Bayesian networks.

14. The method as recited in claim 1, further comprising the step of performing an action based on the classification of the voice communication session.

15. The method as recited in claim 14, wherein the action comprises reporting the classification, providing validation data, taking no action, allowing the voice communication session, dropping the voice communication session, processing the voice communication session as spam or challenging an originator of the voice communication session.

16. A computation system, comprising:
    a microprocessor and a computer-readable medium for classifying a voice communication session, wherein the computer-readable medium is coupled to the microprocessor, and wherein the microprocessor receives and executes instructions from the computer-readable medium and wherein the instructions cause the microprocessor to:
    receive one or more voice communication packets associated with the voice communication session;
    strip off one or more routing and transport protocols from the received voice communication packets to obtain one or more resulting voice data units;
    accumulate two or more of the resulting voice data units to obtain accumulated voice data;
    convert the accumulated voice data into at least one voice signal suitable for analysis by one or more classifiers;

provide the at least one voice signal to one or more classifiers, wherein each classifier extracts one or more properties from the at least one voice signal to obtain extracted properties;

classify the voice communication session as a legitimate call or a spam call based on the extracted properties, wherein the classifying includes determining whether the at least one voice signal is at least one of machine-generated speech, commercial advertisements, and narrations; and modifying the one or more classification models based on at least one of current operational data, historical operational data, user preferences, system preferences and feedback.

17. The method as recited in claim 1, wherein the extracted properties comprise at least one of energy and pitch characteristics of an uncompressed linear PCM form of the at least one voice signal, and a statistical property of a parameter generated by encoding using different standards.

18. A server coupled to a communication network and receiving input for classifying a voice communication session, wherein the server comprises a microprocessor and a computer-readable medium coupled thereto, the microprocessor receives instructions from the computer-readable medium and is programmed to:

Receive one or more voice communication packets associated with the voice communication session, strip off one or more routing and transport protocols from the received voice communication packets to obtain one or more resulting voice data units, accumulate two or more of the resulting voice data units to obtain accumulated voice data, convert the accumulated voice data into at least one voice signal suitable for analysis by one or more classifiers, and provide the at least one voice signal to the one or more classifiers, wherein each classifier extracts one or more properties from the at least one voice signal to obtain extracted properties, and classifies the voice communication session as a legitimate call or a spam call based on the extracted properties, wherein the classifying includes determining whether the at least one voice signal is at least one of machine-generated speech, commercial advertisements, and narrations, wherein each classifier uses one or more classification models, and wherein the microprocessor is further programmed to modify the one or more classification models based on at least one of current operational data, historical operational data, user preferences, system preferences and feedback.

19. The server as recited in claim 18, wherein the voice communication session complies with a SIP, an IMS or a UMA communications standard.

20. The server as recited in claim 18, wherein the one or more properties are also extracted from a voice protocol data encoded within the received voice communication packets.

21. The server as recited in claim 18, wherein the classification of the voice communication session further comprises a casual conversation, a commercial advertisement, a machine-generated speech, a scripted narration or an unknown call type.

22. The server as recited in claim 18, wherein the microprocessor is further programmed to: assign a unique identifier to the voice communication session and label the received voice communication packets with the assigned unique identifier.

23. The server as recited in claim 18, wherein the microprocessor is further programmed to: determine whether a certain amount number of voice data communication packets have has been extracted, accumulated and converted received to classify the voice signal communication session and delay the step of classifying the voice communication session until the certain amount number of voice data communication packets have has been extracted, accumulated and converted received.

24. The server as recited in claim 18, wherein the microprocessor is further programmed to:

extract voice protocol data from the received voice communication packets; and provide the voice protocol data to a codec classifier that extracts the one or more properties from the voice protocol data.

25. The server as recited in claim 18, wherein the one or more classification models comprise:

a codec-based classification model, a wavelet classification model, an energy classification model, a pitch classification model or a recognition-based classification model; and each classification model classifies the voice communication session based on one or more parameters.

26. The server as recited in claim 25, wherein the one or more classification models or the one or more parameters are modified based on current operational data, historical operational data, user preferences, system preferences or feedback.

27. The server as recited in claim 26, wherein the one or more classification models or the one or more parameters are modified automatically or manually.

28. The server as recited in claim 26, wherein the one or more classification models or the one or more parameters are modified to correct one or more previous incorrect classifications.

29. The server as recited in claim 18, wherein the one or more classification models are trained using the extracted properties.

30. The server as recited in claim 18, wherein the one or more classification models comprise decision trees, neural networks or Bayesian networks.

31. The server as recited in claim 18, wherein the microprocessor performs an action based on the classification of the voice communication session.

32. The server as recited in claim 31, wherein the action comprises reporting the classification, providing validation data, taking no action, allowing the voice communication session, dropping the voice communication session, processing the voice communication session as spam or challenging an originator of the voice communication session.

33. The server as recited in claim 18, wherein the microprocessor comprises:

a packet preparation subsystem communicably coupled to the interface;

a classifier subsystem communicably coupled to the packet preparation subsystem;

a response subsystem communicably coupled to the classifier subsystem; and a validation subsystem communicably coupled to the packet preparation subsystem, the classifier subsystem and the response subsystem.

34. The server as recited in claim 33, further comprising a configuration subsystem communicably coupled to the classifier subsystem.

35. The apparatus as recited in claim 18, wherein the extracted properties comprise at least one of energy and pitch characteristics of an uncompressed linear PCM form of the at least one voice signal, and a statistical property of a parameter generated by encoding using different standards.

36. A system comprising:
- a first interface communicably coupled to a private IP network;
- a second interface communicably coupled to a public IP network;
- a firewall or filter communicably coupled to the first interface and second interface; and
- a voice communication classifier located on a computer-readable medium in communication with a microprocessor, wherein the voice communication classifier is communicably coupled to the firewall or filter, and wherein the microprocessor is programmed to: receive one or more voice communication packets associated with a voice communication session, strip off one or more routing and transport protocols from the received voice communication packets to obtain one or more resulting voice data units, accumulate two or more of the resulting voice data units to obtain accumulated voice data, convert the accumulated voice data into at least one voice signal suitable for analysis by one or more classifiers, and provide the at least one voice signal to one or more classifiers, wherein each classifier extracts one or more properties from the at least one voice signal to obtain extracted properties, and classifies the voice communication session as a legitimate call or a spam call based on the extracted properties, wherein the classifying includes determining whether the at least one voice signal is at least one of machine-generated speech, commercial advertisements, and narrations, wherein each classifier uses one or more classification models, and wherein the microprocessor is further programmed to modify the one or more classification models based on at least one of current operational data, historical operational data, user preferences, system preferences and feedback.

37. The system as recited in claim 36, wherein the voice communication session complies with a SIP, an IMS or a UMA communications standard.

38. The system as recited in claim 36, wherein the at least one voice signal is encoded or decoded to an appropriate format for the extraction before the extraction begins, and wherein the one or more properties are also extracted from a voice protocol data encoded within the received voice communication packets.

39. The system as recited in claim 36, wherein the classification of the voice communication session further comprises a casual conversation, a commercial advertisement, a machine-generated speech, a scripted narration or an unknown call type.

40. The system as recited in claim 36, wherein the microprocessor is further programmed to: assign a unique identifier to the voice communication session and label the received voice communication packets with the assigned unique identifier.

41. The system as recited in claim 36, wherein the microprocessor is further programmed to: determine whether a certain amount of voice data has been extracted, accumulated and converted to classify the voice signal and delay the step of classifying the voice communication session until at least one additional voice communication packet is received and the certain amount of voice data has been extracted, accumulated and converted.

42. The system as recited in claim 36, wherein the microprocessor is further programmed to: extract voice protocol data from the received voice communication packets; provide the voice protocol data to a codec classifier that extracts the one or more properties from the voice protocol data.

43. The system as recited in claim 36, wherein the one or more classification models comprise:
- a codec-based classification model, a wavelet classification model, an energy classification model, a pitch classification model or a recognition-based classification model; and
- each classification model classifies the voice communication session based on one or more parameters.

44. The system as recited in claim 43, wherein the one or more parameters are modified based on current operational data, historical operational data, user preferences, system preferences or feedback.

45. The system as recited in claim 43, wherein the one or more classification models are modified automatically or manually.

46. The system as recited in claim 43, wherein the one or more classification models are modified to correct one or more previous incorrect classifications.

47. The system as recited in claim 36, wherein the one or more classification models are trained using unsupervised training that includes a neural network to cluster input into groups and determine how closely the groups align with the classification of the legitimate call and the spam call.

48. The system as recited in claim 36, wherein the one or more classification models comprise decision trees, neural networks or Bayesian networks.

49. The system as recited in claim 36, wherein the voice communication classifier performs an action based on the classification of the voice communication session.

50. The system as recited in claim 36, wherein the action comprises reporting the classification, providing validation data, taking no action, allowing the voice communication session, dropping the voice communication session, processing the voice communication session as spam or challenging an originator of the voice communication session.

51. The system as recited in claim 36, wherein the voice communication classifier comprises:
- a packet preparation subsystem communicably coupled to the interface;
- a classifier subsystem communicably coupled to the packet preparation subsystem;
- a response subsystem communicably coupled to the classifier subsystem; and
- a validation subsystem communicably coupled to the packet preparation subsystem, the classifier subsystem and the response subsystem.

52. The system as recited in claim 51, further comprising a configuration subsystem communicably coupled to the classifier subsystem.

53. The system as recited in claim 36, wherein the extracted properties comprise at least one of energy and pitch characteristics of an uncompressed linear PCM form of the at least one voice signal, and a statistical property of a parameter generated by encoding using different standards.

* * * * *

UNITED STATES PATENT AND TRADEMARK OFFICE
CERTIFICATE OF CORRECTION

PATENT NO.        : 9,531,873 B2                          Page 1 of 1
APPLICATION NO.   : 11/521427
DATED             : December 27, 2016
INVENTOR(S)       : Srikrishna Kurapati et al.

It is certified that error appears in the above-identified patent and that said Letters Patent is hereby corrected as shown below:

In the Claims

At Column 17, Line 27, please delete "a" and insert --the-- therein.

At Column 17, Line 31, please delete "a" and insert --the-- therein.

At Column 17, Line 34, please delete "a" and insert --the-- therein.

At Column 17, Line 38, please delete "a" and insert --the-- therein.

At Column 19, Line 26, please delete "Receive" and insert --receive-- therein.

At Column 22, Line 4, before the word "provide" insert --and-- therein.

Signed and Sealed this
Twenty-first Day of March, 2017

Michelle K. Lee
*Director of the United States Patent and Trademark Office*